Jan. 11, 1966  A. WALLER ETAL  3,228,717

LATCH CONSTRUCTION

Filed July 5, 1963  3 Sheets-Sheet 1

Arthur Waller
Otto Isensee, Jr.
INVENTORS

BY Ooms, McDougall & Hersh
Attys

United States Patent Office 3,228,717
Patented Jan. 11, 1966

3,228,717
LATCH CONSTRUCTION
Arthur Waller, Highland Park, and Otto Isensee, Jr., Chicago, Ill., assignors to Bull Dog Lock Company, Chicago, Ill., a corporation of Illinois
Filed July 5, 1963, Ser. No. 292,874
10 Claims. (Cl. 292—70)

This invention relates to an improved latch construction designed to hold relatively movable elements in a stationary position.

The construction of this invention, which is particularly suited for use on doors and other movable closure elements, is characterized by a particularly durable but economical construction. It has long been recognized that latch elements used for cabinets or on doors or closures for other constructions have been prone to many defects. The latch elements used in many cases can be made inoperative after only slight abuse. A further major problem with known latch elements concerns their tendency to move out of alignment after a period of use. It is, accordingly, extremely desirable that latch elements of a durable nature be provided whereby they will not become inoperative, and whereby they can maintain proper alignment in the constructions with which they are associated. It is also extremely important that the latch elements be of an economical nature since an extremely large number of such elements are employed, as in the construction of homes.

It is a general object of this invention to provide improved latch constructions which are capable of withstanding substantial abuse and which are also capable of maintaining proper alignment in the constructions with which they are to be associated.

It is a further object of this invention to provide latch constructions having the durable character described which can be manufactured on a large scale and without undue expense whereby an economical construction can be provided.

These and other objects of this invention will appear hereinafter, and for purposes of illustration but not of limitation, specific embodiments of this invention are shown in the accompanying drawings in which.

The latch constructions of this invention are provided for use in combination with any two relatively movable elements which employ the latch construction for holding the elements temporarily in a stationary position. The latch construction includes a female member which is fixed to one of the elements and a male member fixed to the other of the elements. It will be understood that the instant invention can be applied where both of the elements are movable or where one is movable and one is stationary. It will also be apparent that the male and female portions of the latch construction of this invention can be applied to either of the elements.

The distinctive features of the instant invention are primarily related to the female member and its associated parts. This member comprises a first portion having at least two relatively movable sections. A second resilient portion is fitted around these sections and the male member is adapted to be inserted in an opening defined between the sections of the female member. The male member and the opening defined in the female member are dimensioned whereby the male member will be frictionally received in the female member. The resilient portion of the female member is adapted to come into play when the male member has been inserted whereby the sections of the female member will spread apart in opposition to the action of the resilient member. This combination provides secure holding of the members relative to each other and virtually eliminates any tendency on the part of the elements to which the latch construction is attached to become misaligned. Thus, the female member firmly holds the male member and since portions of the female member engage the male member on all sides, relative movement in any direction, while the members are latched, is prevented. Thus, the forces of gravity will not result in downward movement of a door while the door is latched if the construction of this invention is employed. Similarly, any warping tendencies in door elements or the like will be resisted by the latch construction since the female member will prevent movement of the male member in any direction.

Figure 1:
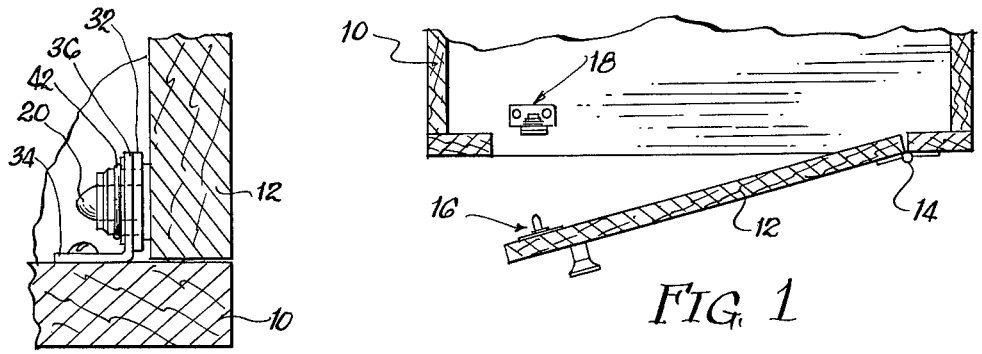
FIGURE 1 is a diagrammatic view of a cabinet construction which includes the latch means of this invention.
Figure 2:
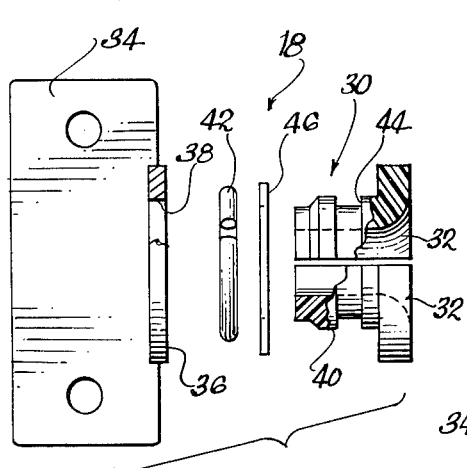
FIGURE 2 is an enlarged fragmentary view illustrating the latch means with the door closed.

The accompanying drawings illustrate certain specific embodiments characterized by the features of this invention. FIGURE 1 illustrates a cabinet 10 having a door 12 which is connected to the cabinet by means of a hinge 14. The latch construction of this invention includes a male member 16 which is attached to the door 12 and a female member 18 mounted on the cabinet 10.

Figures 3, 4:
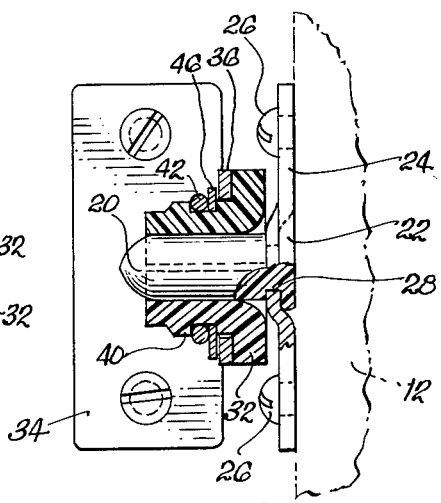
FIGURE 3 is an exploded view, partly in section, illustrating the elements included in one form of the latch means.
FIGURE 4 is an enlarged detail view, partly in section, illustrating the latch means in a closed position.

With reference to FIGURE 4, it will be noted that the male member includes a pin 20 which includes a base portion 22. A holding plate 24 is adapted to be secured to the door 12 by means of the screws 26 and this holding plate defines a central opening for receiving the pin 20. The pin includes an annular recess 28 which is dimensioned to correspond to the opening in the plate 24 and the base portion 22 of the pin provides a shoulder for holding the pin in place. The plate 24 may be split to provide for the initial insertion of the pin 20.

The female member 18 includes a first portion 30 made up of sections 32. In the embodiment shown in FIGURES 3 and 4, the female member is adapted to be attached to the cabinet 10 by means of a bracket 34. This bracket includes an upstanding portion 36 which defines an opening 38. The shank 40 of the female member is dimensioned to be loosely received within the opening 38.

The female member is secured in place through the use of a split ring 42. This split ring is adapted to be received in an annular recess 44 formed in the periphery of the shank 40. The split ring 42 can be dimensioned whereby its outer diameter will exceed the diameter of the opening 38. Accordingly, when the split ring is positioned after insertion of the shank 40 into the opening 38, the female member will be held in position.

In the example shown in FIGURE 3, a washer element 46, which may also be in the form of a split ring, is positioned in the recess 44 along with the split ring 42. This washer element has a larger diameter than the split ring 42 and it serves to insure locking of the female member on the bracket 34. The washer 46 may take the form of any one of the split washers 48, 50, 52 and 54 shown in FIGURES 11, 12, 13 and 14, respectively. The washers 50, 52 and 54 each include portions of larger diameter whereby a greater surface area bearing against the bracket portion 36 will be provided.

Figure 5:
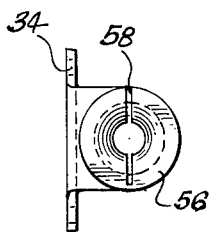
FIGURES 5 through 8 illustrate alternative forms of a portion of the female member employed in the latch means of this invention.
Figure 6:
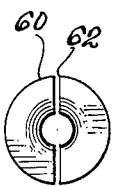
Figure 7:
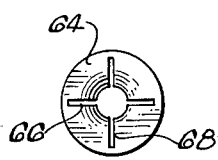
Figure 8:
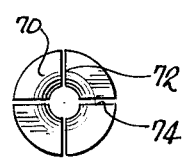

The portion 30 of the female member may assume various forms, and certain examples thereof are shown in FIGURES 5 through 8. In FIGURE 5, a one-piece member 56 is provided with a split along the line 58; however this split terminates whereby the member 56 remains as a single piece. It will be apparent, however, that the respective sections of the member 56 can be moved relative to each other. The example shown in FIGURE 6 includes a member 60 which is split along the line 62 to provide two individual pieces. The member 64 shown in FIGURE 7 is split along two lines, 66 and 68; however, these lines terminate short of the edge of the member 64 to again provide one integral piece. The member 70 shown in FIGURE 8 is made up of four separate pieces which are formed when the member 70 is split completely along the lines 72 and 74.

In the use of the latch contsruction shown in FIGURES 1 through 4, the pin 20 is moved into the opening defined between the section 32 of the female member 18. The opening between the sections 32 is dimensioned to be slightly smaller than the diameter of the pin 20 whereby the pin will force the sections 32 apart as it is inserted. The split ring 42 is dimensioned whereby it will resist the force exerted during insertion of the pin 20 and, accordingly, a tight friction fit is provided between the sections 32 and the pin 20. The friction type engagement of the pin 20 can be accomplished by any of the members shown in FIGURES 5 through 8. In any case, spreading of these members in opposition to the action of the associated split ring will result in the desired stationary engagement of the elements associated with the latch.

Figure 9:
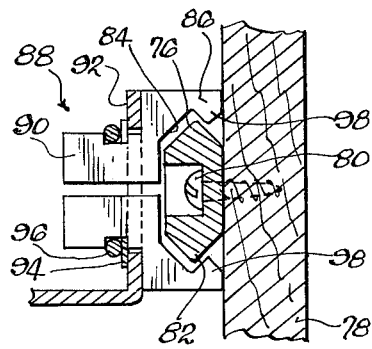
FIGURE 9 is a detail view of an alternative form of a latch construction.
Figure 10:
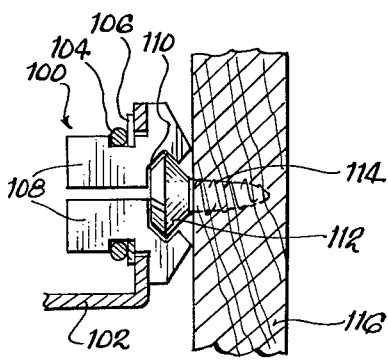
FIGURE 10 is an additional detail view of the construction shown in FIGURE 9.
Figure 11:
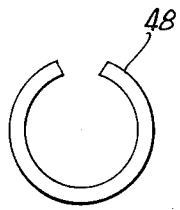
FIGURES 11 through 14 illustrate alternative forms of an additional portion of the female members employed in the latch construction.
Figure 12:
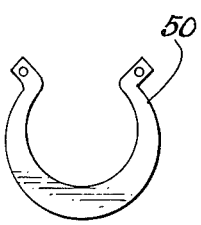
Figure 13:
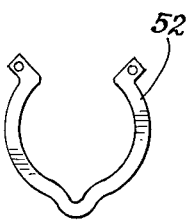
Figure 14:
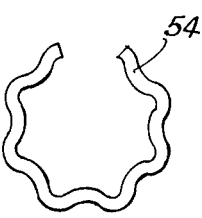

FIGURES 9 and 10 illustrate embodiments wherein a mechanical holding of the male member by the female member is accomplished. In FIGURE 9, the male member 76 is secured to the element 78 by means of the screw 80. The male member includes protruding side portions 82 which are adapted to be received in the recessed portions 84 defined by the sections 86 of the female member 88. As in the previous example, the sections 86 include a shank portion 90 which is held relative to the bracket 92 by means of a split washer 94 and split ring 96. In the operation of this construction, the sections 86 are spread apart when the large diameter portions 82 of the male member are forced past the inwardly protruding portions 98 formed in the sections 86. The resilient action of the split ring 96 will cause the sections 86 to be forced together after the male member has been inserted, and even though the sections 86 do not press against the male member, a latch action will still be effected. By selecting a split ring of proper strength, the opening and closing of the element 78 can be accomplished with the desired ease.

FIGURE 10 illustrates an embodiment similar to that shown in FIGURE 9 wherein the female member 100 is disposed on a bracket 102 and is held thereon by means of a split ring 104 and washer 106. The sections 108 of the female member define a recess 110 which is adapted to receive the enlarged end 112 of the male member 114. In this embodiment, the male member comprises a screw whereby it can be attached to the element 116 and whereby the integral head thereof can be employed for engagement with the female member.

Figures 15, 16:
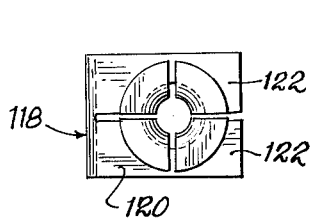
FIGURE 15 is an elevational view illustrating the female member as it is associated with a supporting bracket therefor.
FIGURE 16 is a side elevational view illustrating the combination shown in FIGURE 15.
Figure 17:
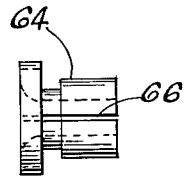
FIGURE 17 is a side elevation of the member shown in FIGURE 7.

FIGURES 15 and 16 illustrate a modification wherein a bracket element 118 includes a portion 120 which is formed of two arms 122. The arms define a central opening which is adapted to receive the shank portions 124 of the sections 126 of the female member. It will be noted that, in this case, the shank portions are of a larger diameter than the opening defined between the arms 122. However, the arms 122 are adapted to be spread apart to initially receive the sections 126 and these arms are of a resilient character whereby they can assume the function of the split ring described above. A washer element 128 may also be included in this combination.

Figure 18:
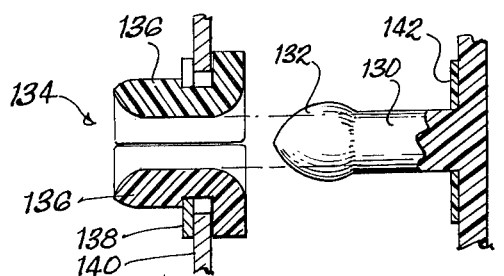
FIGURE 18 is an exploded cross-sectional view of a still further alternative form of this invention.

In the construction shown in FIGURE 18, the male member 130 is provided with an enlarged end 132. This member is adapted to be forced into female member 134 which is formed of sections 136. A split ring 138 serves to secure the female member to a bracket portion 140. When the end 132 of the male member has passed through the opening defined between the sections 136, it will provide for mechanical securement of the respective members in addition to the friction fit which is accomplished through engagement of the sections 136 with the member 130.

The embodiment shown in FIGURE 18 also includes a resilient washer 142 snugly fit around the base of the male member 130. This washer, which may be formed of felt, plastic, rubber or of a similar resilient material, serves to reduce noise when the latch members are brought together.

Figures 19, 20:
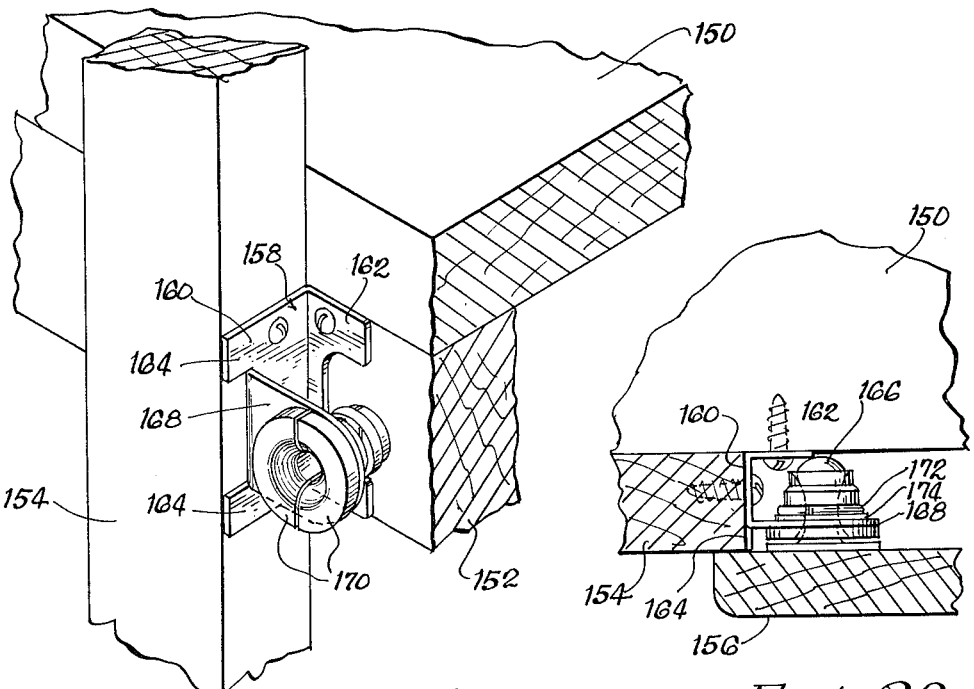
FIGURE 19 is a fragmentary perspective view illustrating an additional alternative form of this invention.
FIGURE 20 is a cross-sectional view illustrating the structure shown in FIGURE 19.

FIGURE 19 illustrates an alternative embodiment which is particularly suitable for use in combination with cabinet structures of the type shown. These structures comprise shelves 150 which are mounted on continuous horizontal support beams 152. Vertical beams 154 are provided at intervals along the beams 152 to define the openings for the various shelves. Doors 156 are ordinarily provided for each of the various openings and as shown in FIGURE 20, these doors engage the outer surface of the beams 154 when closed.

The latch construction illustrated in FIGURES 19 and 20 comprises a bracket member 158 which is designed for ease of installation in cabinet constructions of the type shown. Specifically, the bracket member defines a base having two portions, 160 and 162, formed at right angles. The portion 160 is dimensioned to correspond to the conventional width of the beam 154, ordinarily ¾ inch. With this arrangement, the bracket can be mounted by securing the portion 162 to the horizontal beam 152 and securing the portion 160 to the vertical beam 154. If the latch is to be located at a point away from the horizontal beam 152, then it can be accurately positioned by simply aligning the extensions 164 formed in the portion 160 with the outer surface of the beam 154.

This arrangement permits uniform assembly of the bracket holding the female member with respect to the door 156 holding the male member 166. As shown in FIGURE 20, proper alignment of the bracket permits positioning of the door 156 flush with the outer surface of the member 154.

The latch mechanism of FIGURE 19 is mounted on the bent-back portion 168 of the bracket. This latch includes split members 170 which are adapted to be passed through an opening in the portion 168 and to be held in place by means of split ring 172. A washer 174 may be employed if desired. It will be noted that the contours of the male member 166 and the internal contours of the split members 170 closely conform. This arrangement has been found to provide a particularly firm interfitting of the members of the latch.

Figures 21, 22:
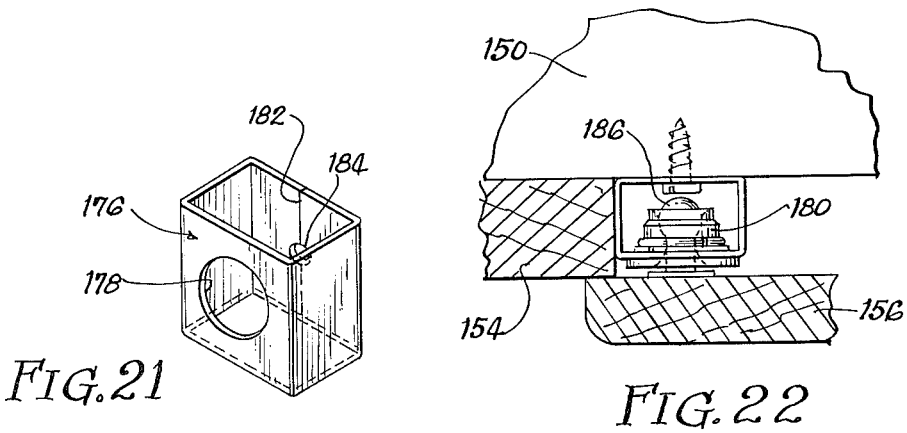
FIGURE 21 is a detail perspective view of a still further alternative bracket structure.
FIGURE 22 is a fragmentary cross-sectional view illustrating the use of the bracket structure of FIGURE 21; and, FIGURES 23 and 24 comprise detail views of alternative designs for a bracket structure of the type shown in FIGURE 21.

FIGURE 21 illustrates an additional bracket modification 176 which can also be used with a cabinet construction of the type shown above. In this instance, the bracket comprises a box-like shape defining an opening 178 for receiving split female members 180 such as shown in FIGURE 22. The bracket can be formed by bending a flat strip to the shape shown whereby the opposite ends of the strip will be joined as at 182 in the back portion of the bracket. A screw hole 184 is formed in the back portion to provide for mounting of the bracket. This arrangement provides great efficiency with respect to installation since the screw and screw driver can be passed through the opening 178 and the bracket mounted by means of a single screw. The bracket illustrated is obviously of an extremely compact nature which provides distinct advantages over other structures which preferably include a plurality of fastening means. The bracket 176 is also preferably dimensioned whereby it will be automatically aligned relative to male member 186. Thus, the bracket is dimensioned whereby the front face thereof will extend short of the outer surface of a member 154 of conventional size.

Figures 23, 24:
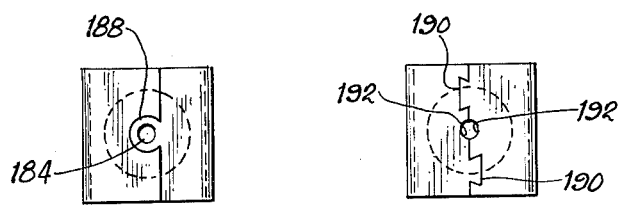

The bracket shown in FIGURE 21 can be constructed to provide for interlocking of the ends when the bracket is formed into shape. In FIGURE 23, a tab portion 188 is provided with the screw hole 184 and this tab portion is adapted to be pressed into a corresponding opening defined in the other end of the bracket. The modification shown in FIGURE 24 includes a pair of tab portions 190. The opposed ends of the bracket are each formed with semi-circular openings 192 whereby mating of these ends will provide the screw hole.

With reference to the materials employed in the latch construction, it is preferable to provide for the use of plastic materials such as nylon, Delryn, hard polyethylene or the like for at least one of the portions which come into sliding contact. Specifically, either the sections which form the opening in the female member or the pin portion of the male member should be formed of such materials. If either or both of these portions of the latch are so formed, wear can be materially reduced and silence in operation can be accomplished. By avoiding metal-to-metal sliding contact, the desirability of the latch construction is materially increased. It will also be noted that non-metallic materials of the type described are available which can be economically acquired and formed in accordance with the needs of this invention. It can also be noted that the use of such materials minimizes the danger of corrosion and also eliminates lubrication problems since many such materials are self-lubricating.

As previously noted, one important advantage of the instant invention concerns the ability of the latch construction to maintain doors and the like in alignment when the latches are engaged. Thus, it is well-known that doors tend to sag or warp over extended periods and alignment problems will result unless means are provided for minimizing the tendency towards sagging or warping. Since the female members, which characterize the instant invention, are of an annular character, they will grip the male members in every direction and will therefore resist forces set up in the elements to which the members are attached.

It will be appreciated that many changes and modifications can be made in the latch constructions described which provide the characteristics of this invention without departing from the spirit thereof particularly as defined in the following claims.

That which is claimed is:

1. A latch construction for holding two relatively movable elements in stationary relationship comprising a female member fixed to one of said elements and a male member fixed to the other of said elements and adapted to be received by said female member, said female member comprising a first portion formed of at least two relatively movable sections, a second resilient portion, and a seat formed in the periphery of said first portion whereby said second portion can be fitted around said first portion, said seat comprising an annular recess formed in said first portion and said second portion comprising a split ring dimensioned to be held in said recess, said male member when received by said first portion being adapted to spread apart the sections of said first portion in opposition to the resilient action of said second portion, and wherein said female member includes a stem portion dimensioned to be received in an opening defined in said one element, said annular recess being formed in said stem portion whereby said split ring when received by said recess is adapted to hold said female member from movement out of said opening.

2. A construction in accordance with claim 1 including a washer-like member adapted to be fitted around said stem portion adjacent said split ring and adapted to cooperate to hold said female member in position in said opening.

3. A construction in accordance with claim 1 wherein said female member is mounted on a bracket and wherein said bracket is secured to said one element.

4. A construction in accordance with claim 1 wherein said male member is provided with an enlarged end which is adapted to pass through said female member to thereby mechanically hold said male and female members in a stationary relationship.

5. A latch construction for holding two relatively movable members in stationary relationship comprising a bracket fixed to one of said members, a female member mounted on said bracket, and a male member fixed to the other of said members adapted to be received by said female member, said female member comprising a first portion formed of at least two relatively movable sections and a second resilient portion adapted to be fitted around said first portion, said resilient portion cooperating to hold said female member in position on said bracket, said male member when received by said first portion being adapted to spread apart the sections of said first portions in opposition to the resilient action of said second portion.

6. A construction in accordance with claim 5 including a split washer means cooperating with said resilient portion for holding said female member on said bracket means.

7. A construction in accordance with claim 5 wherein said bracket means includes first and second portions formed in right angles with respect to each other, means defined by said portions of the bracket means for securing the bracket means to said one relatively movable member, and an additional portion formed integrally with one of said first mentioned bracket portions and extending outwardly therefrom, said additional portion defining an opening for receiving said female member.

8. A construction in accordance with claim 7 wherein one of said first mentioned bracket portions includes extensions located beyond the position of said additional portion, said extensions acting as aligning means for mounting said bracket on said one relatively movable member.

9. A construction in accordance with claim 5 wherein said bracket comprises a generally box-like shape having an outer side defining an opening for receiving said female member and an opposite side defining a similar opening for receiving a fastener, whereby said bracket can be attached to said one relatively movable member by passing the fastener and the fastener securing means through said first mentioned opening.

10. A latch construction for holding two relatively movable elements in stationary relationship comprising a bracket fixed to one of said elements, an opening defined by said bracket, a female member defining an outer flange, said female member being adapted to be received in the opening defined by said bracket with said flange being located in abutting relationship with one side wall of said bracket, and a male member fixed to the other of said elements and adapted to be received by said female member, said female member comprising a first portion formed of at least two relatively movable sections, said sections normally defining an opening smaller than said male member, a second resilient portion, and a seat formed in the periphery of said first portion behind said flange whereby said second portion can be fitted around said first portion, said male member when received by said first portion being adapted to spread apart the sections of said first portion in opposition to the resilient action of said second portion, and wherein said second resilient portion is larger than said opening and is seated in substantially abutting relationship with the opposite side wall of said bracket for holding said female member in position on said bracket.

References Cited by the Examiner
UNITED STATES PATENTS

| | | | |
|---|---|---|---|
| 100,616 | 3/1870 | Gravatt | 292—18 |
| 2,577,507 | 12/1951 | Bergdorf | 292—17 |
| 3,038,747 | 6/1962 | Rapata | 292—17 |
| 3,061,346 | 10/1962 | Jorgensen. | |
| 3,103,378 | 9/1963 | Ahlgren | 292—17 |

JOSEPH D. SEERS, *Primary Examiner.*

DONLEY J. STOCKING, M. HENSON WOOD, JR., *Examiners.*